Patented Oct. 11, 1932

1,881,430

UNITED STATES PATENT OFFICE

HANS FINKELSTEIN AND FRIEDRICH ACHTERBERG, OF UERDINGEN, GERMANY, ASSIGNORS TO I. G. FARBENINDUSTRIE AKTIENGESELLSCHAFT, OF FRANKFORT-ON-THE-MAIN, GERMANY

PROCESS FOR THE MANUFACTURE OF SOLUTIONS CONTAINING A COMPOUND OF FLUORINE AND ALUMINIUM

No Drawing. Application filed May 17, 1930, Serial No. 453,405, and in Germany May 15, 1929.

The present invention concerns the manufacture of solutions of compounds containing fluorine and aluminium by the action of aluminium chloride solutions on sparingly soluble fluorine compounds and consists in treating substances containing fluorine in aqueous suspension with aluminium chloride in quantities such that at least two equivalents of aluminium are employed for each one equivalent of fluorine.

In accordance with the present invention practically all the fluorine in sparingly soluble substances containing fluorine can be converted into a soluble form in a particularly simple manner when aluminium chloride is employed and the quantity thereof is so adjusted that at least two equivalents of aluminium are provided with respect to each one equivalent of fluorine. Under such conditions the hitherto unknown readily soluble complex $AlF_3.AlCl_3$ is formed; hence the solution of calcium fluoride, for example, proceeds according to the equation:

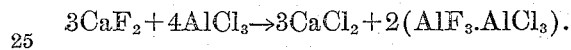
$3CaF_2 + 4AlCl_3 \rightarrow 3CaCl_2 + 2(AlF_3.AlCl_3)$.

The aluminium chloride converts only the fluorides into soluble compounds; all other constituents of the starting material, which are insoluble in water or acid, remain behind and can be removed from the solution by filtration. However, not only the gangue present in fluorine minerals, such as silicic acid and silicates remains undissolved; compounds, wherein the fluorine is present in a complex form, for example combined with silicon or tantalum, can be decomposed by means of aluminium chloride in such a manner that the whole of the fluorine passes into solution in combination with aluminium and the element acting as the central atom in the originally existing complex remains behind in the form of its oxide or hydroxide. Thus, in working up silico fluorides by means of aluminium chloride solution a separation of fluorine and silicon is achieved, the latter forming silicic acid, which can be readily filtered.

Owing to the consideration that the presence of calcium ions in a comparatively larger concentration combined with the pronounced tendency to a formation of calcium fluoride might destroy the complex present in the solution the methods hitherto in use for the working up have employed as a decomposing agent aluminium sulphate, which forms with the calcium the sparingly soluble calcium sulphate. In the present process, however, which employs as the agent for the working up an aluminium salt of an acid forming a soluble calcium salt, it has been established that the complex present in the solution is so stable, that even calcium ions in high concentration cannot decompose the same. In particular, it was not to be expected that the complex $AlF_3.AlCl_3$ would for its formation appropriate all the fluorine from other complex compounds such as silico fluorides and the like.

To carry out the present process it is advantageous to heat a suspension of the insoluble fluorine compounds in an aluminium chloride solution; a little hydrochloric acid may be added. The temperature may vary within wide limits; the higher the temperature, the shorter is the time required for accomplishing the reaction. We prefer to use a temperature above 80° C. If a pressure- and an acid proof reaction vessel is available, a superatmospheric pressure and a corresponding temperature above the normal boiling point of the solution may be employed. After the separation of the residue a solution is obtained, containing besides aluminium and fluorine in the form of the above indicated complex $AlF_3.AlCl_3$ usually also ions of alkali or alkaline earth metals. From this solution solid compounds containing aluminium and flourine can be separated by various methods.

The following examples will further illustrate the invention:—

Example 1

To a solution of 180 parts by weight of aluminium chloride (calculated on the anhydrous compound) in 500 parts of water are added 80 parts by weight of pulverized fluorspar. This mixture is heated to boiling and boiling is continued until no further solution occurs, generally about 45 minutes.

The solution is separated from the residue, which consists of nearly pure silicic acid and can be easily filtered and washed out.

To the dissolving mixture can be added, if desired or necessary 10 to 20 parts by weight of concentrated hydrochloric acid.

*Example 2*

To 60 parts by weight of sodium silico fluoride and 180 parts by weight of aluminium chloride (calculated on the anhydrous compound) are added 500 parts of water and the whole is heated to boiling and boiled with stirring for about one hour. The precipitate is separated by filtering with suction from the solution containing the aluminium and flourine. After washing it no longer contains flourine and consists of practically pure silicic acid.

Instead of calcium fluoride the flourides of zinc, strontium and barium can be used.

Titanoflourides give results similar to those obtained with silico-fluorides.

We claim:

1. Process for the manufacture of solutions containing a compound of fluorine and aluminium which consists in treating a sparingly soluble fluorine compound with an aqueous solution of aluminium chloride in quantities such that at least two equivalents of aluminium are employed for each one equivalent of fluorine.

2. Process for the manufacture of solutions containing a compound of fluorine and aluminium which consists in treating at a temperature above 80° C. a sparingly soluble fluorine compound with an aqueous solution of aluminium chloride in quantities such that at least two equivalents of aluminium are employed for each one equivalent of fluorine.

3. Process for the manufacture of solutions containing a compound of fluorine and aluminium which consists in boiling a sparingly soluble fluorine compound with an aqueous solution of aluminium chloride in quantities such that at least two equivalents of aluminium are employed for each one equivalent of fluorine.

4. Process for the manufacture of solutions containing a compound of fluorine and aluminium which consists in treating calcium fluoride with an aqueous solution of aluminium chloride in quantities such that at least two equivalents of aluminium are employed for each one equivalent of fluorine.

5. Process for the manufacture of solutions containing a compound of fluorine and aluminium which consists in treating ground fluorspar with an aqueous solution of aluminium chloride in quantities such that at least two equivalents of aluminium are employed for each one equivalent of fluorine.

6. As a new composition of matter a solution containing aluminium, fluorine, and chlorine in the ratio of at least two equivalents of aluminium and one equivalent of chlorine for each one equivalent of fluorine, corresponding to the formula $AlF_3.AlCl_3$.

In testimony whereof, we affix our signatures.

HANS FINKELSTEIN.
FRIEDRICH ACHTERBERG.